United States Patent [19]

Thede

[11] 4,439,086

[45] Mar. 27, 1984

[54] BOAT LOADER

[76] Inventor: Ralph W. Thede, 735 Edgewater St. NW., Salem, Oreg. 97304

[21] Appl. No.: 394,270

[22] Filed: Jul. 1, 1982

[51] Int. Cl.³ .............................................. B60R 9/04
[52] U.S. Cl. .................................. 414/462; 224/310
[58] Field of Search ................. 414/462; 224/310, 309

[56] References Cited

U.S. PATENT DOCUMENTS

| 2,896,804 | 7/1959 | Ingram | 414/462 |
| 3,495,729 | 2/1970 | Kruse | 414/462 |
| 3,521,774 | 7/1970 | Raypholtz | 414/462 |
| 3,720,334 | 3/1973 | Permut et al. | 414/462 |
| 4,376,611 | 3/1983 | Koop | 414/462 |

FOREIGN PATENT DOCUMENTS

| 410047 | 5/1969 | Australia | 414/462 |
| 14185 | 8/1980 | European Pat. Off. | 224/310 |

*Primary Examiner*—Robert J. Spar
*Assistant Examiner*—Janice Krizek
*Attorney, Agent, or Firm*—Chernoff, Vilhauer, McClung, Birdwell & Stenzel

[57] ABSTRACT

A loader permitting a boat to be conveniently lifted from an upright position alongside a vehicle to an inverted position atop the vehicle includes a pair of tracks extending transversely across the top of the vehicle and downwardly along the side of the vehicle, and a carriage mounted for travel along the tracks between a raised transport position and a lowered loading and unloading position. A cable is connected with a winch and extends around a pair of sheaves located on opposite sides of the carriage to extend from the winch to a lower or far side sheave, then to an upper or near side sheave, and then to the boat. In loading a boat, retracting the cable first tilts the boat sideways into contact with the carriage and then raises both the carriage and the boat to the transport position. The apparatus permits a boat to be loaded onto or unloaded from the top of a vehicle used to tow another vehicle such as a camping trailer without the need to first unhitch the trailer.

10 Claims, 5 Drawing Figures

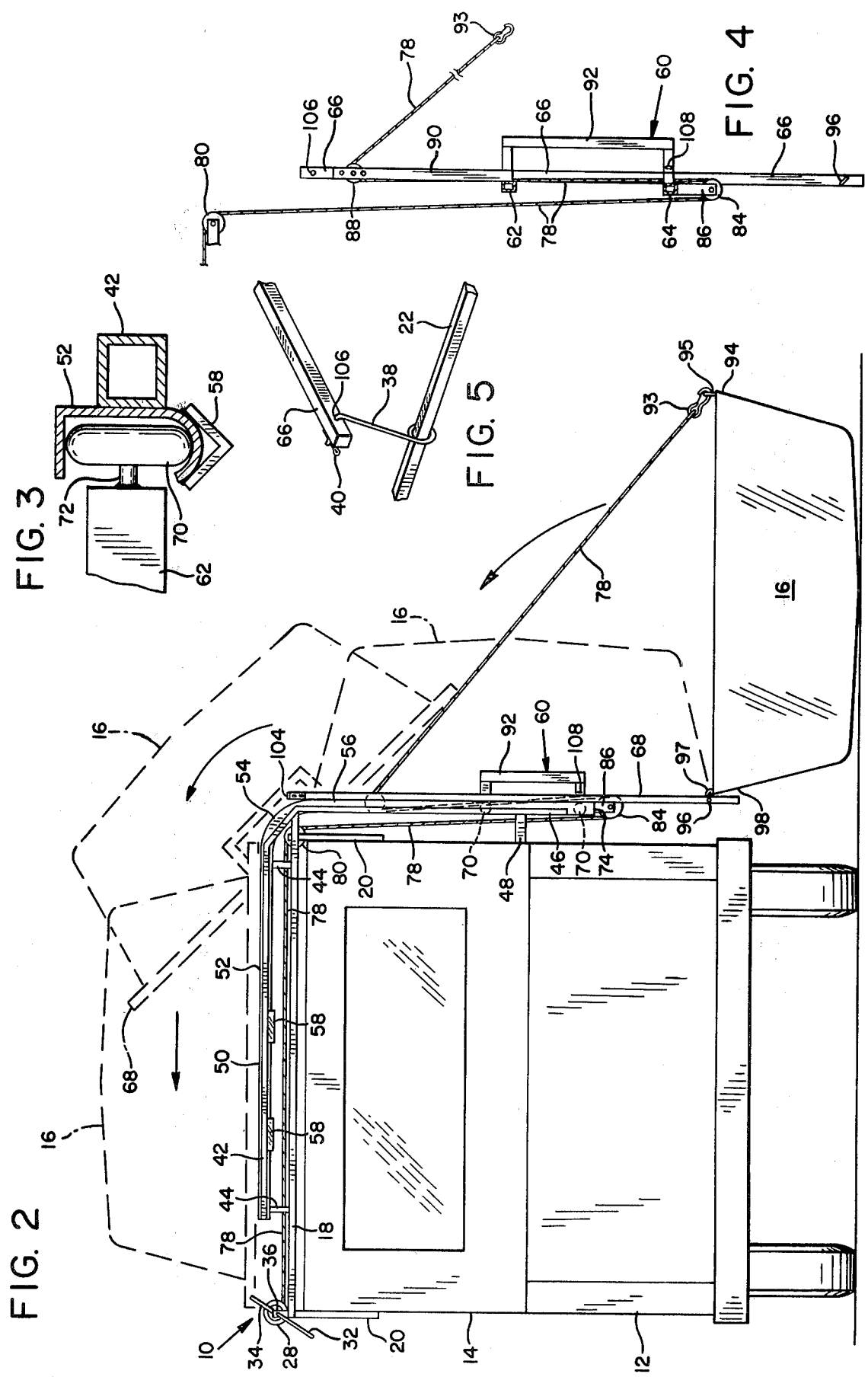

BOAT LOADER

BACKGROUND OF THE INVENTION

The present invention relates to improvements in devices for loading and securely retaining small boats atop vehicles, and particularly to a boat loader adapted for loading a boat from a position on the ground alongside a vehicle.

Small boats have long been carried on top of cars and vans by vacationers. While such boats, if they are small enough, can be manually lifted into place atop a car or van, lifting a boat is difficult and inconvenient, if not dangerous. Particularly for the largest of the boats within the size range which can be carried on top of a vehicle, it is very difficult to manually lift a boat to the top of a vehicle. Loaders provided in the past to relieve people of the physical work of loading a boat atop a vehicle lift the boat up over the rear end of a vehicle such as a van, to an inverted position atop the van. Such boat loaders utilize ropes to lift a boat and invert it end over end. This operation, however, can be somewhat dangerous, particularly in windy weather.

While portable cranes are installed on some trucks to enable boats to be loaded, such cranes are expensive and heavy. Private automobiles and vans are limited in their load-carrying capacity. A light yet strong, relatively inexpensive, loader is needed, then, to lift and support a boat without overloading a private motor vehicle.

An associated problem which has become more pronounced with the recent increase in use of camping trailers is that carrying a boat atop a towing vehicle requires that the trailer be unhitched to permit use of a boat loader of the type described above. Particularly when the hitch is of the type which utilizes levers to control weight distribution between the trailer and the towing vehicle, the time required to unhitch and rehitch a trailer makes it quite inconvenient to unload or load a boat over the rear end of the towing vehicle. As a consequence, it is often impractical to unload a boat over the rear of a towing vehicle during a short stop, as to briefly test the fishing at a location discovered during one's travels.

What is desired, then, is a reasonably inexpensive boat loader which is simple and convenient to use, which is light in weight, which does not require a trailer to be unhitched from the vehicle on which the boat is to be loaded, and which provides safe and secure support for a boat when it is atop a vehicle.

SUMMARY OF THE INVENTION

The present invention provides a boat loader which overcomes the shortcomings of previously available over-the-rear boat loaders by permitting a boat to be lifted from an upright position alongside a motor vehicle to an inverted position atop the vehicle.

In a preferred embodiment, the boat loader of the present invention includes a pair of parallel tracks which extend horizontally across the top of a vehicle, curvingly extend around the upper edge of the vehicle, and then descend generally vertically along the side of the vehicle. A carriage is movably mounted on the tracks to support the boat in an inverted position atop the vehicle when the carriage is located on the horizontal portions of the tracks. In lowering the boat the carriage moves along the tracks, tilting as it progresses along the curved portions of the track to a vertically oriented position in which the boat is supported alongside the vehicle with one side downward.

The position of the carriage is controlled by a cable extending from a winch mounted atop the vehicle near the far end of the horizontal portions of the parallel tracks. The cable extends in an "S"-shaped path around a pair of rollers or sheaves mounted on the carriage and a roller mounted near the top edge of the vehicle. The free end of the cable extends from the one of the sheaves which is higher when the carriage is on the depending portion of the tracks, to an attachment point on the side of the boat further from the vehicle when the boat is upright on the ground. The portion of the cable extending downward from the roller is rove in an "S" conformation around first the sheave which is lower and then the sheave which is higher on the carriage when the carriage is on the depending portions of the tracks. The near side of the boat is pivotably connected to the carriage, thus permitting the boat to be tilted upward toward the vehicle by retracting the cable.

Using this arrangement and winding the cable in, the boat is first tilted to a position with the far side raised above the near side. Continued winding of the cable thereafter raises the carriage and boat along the tracks. The carriage progresses along the curved portions of the tracks to the horizontal portions of the tracks, tilting the boat further to an inverted position atop the vehicle. The lower sheave is located closer than centerline of the carriage to the near, or lower, side of the carriage, ensuring that the cable continues to pull the carriage upwardly, during loading, until the boat is tilted beyond the point of balance toward the inverted position.

When the carriage reaches the properly centered location atop the vehicle it actuates a switch, stopping the cable winch. Both sides of the boat may be securely fastened directly to the carriage, and the carriage may be locked into position on the horizontal portions of the tracks to securely hold the boat during transport. Unloading the boat is simply the reverse of the loading procedure.

It is therefore a primary objective of the present invention to provide an improved boat loader for lifting a boat from an upright position alongside a vehicle to an inverted position atop the vehicle.

It is another important objective of the present invention to provide a boat loader which safely and easily lowers a boat from an inverted position atop a vehicle to an upright position alongside the vehicle.

It is a feature of the boat loader of the present invention that it includes a carriage mounted on a pair of parallel tracks to safely and positively control the position and orientation of the boat during loading and unloading.

It is another important feature of the present invention that it includes a simple device for securely locking the boat into position atop a vehicle.

It is another feature of the present invention that it includes a lift cable and an arrangement whereby the lift cable tilts a boat between an upright position and a rotated position with one side of the boat above the other.

It is a very important advantage of the present invention that it permits a boat to be loaded on or unloaded from a vehicle towing a trailer without having to unhitch the trailer from the vehicle on which the boat is to be carried.

It is another advantage of the present invention that it provides effective control over the boat despite windy weather.

BRIEF DESCRIPTION OF THE DRAWINGS

FIG. 2 is a rear elevational view of the pick-up truck and the boat loader shown in FIG. 1.

FIG. 3 is a sectional view of one of the tracks of the boat loader shown in FIG. 1, taken along line 3—3.

FIG. 4 is a sectional view of a portion of the carriage of the boat loader shown in FIG. 1, taken along line 4—4.

FIG. 5 is a detail view showing the arrangement of the lock used to retain the boat loader in the transit position.

DETAILED DESCRIPTION OF THE INVENTION

Figure 1:
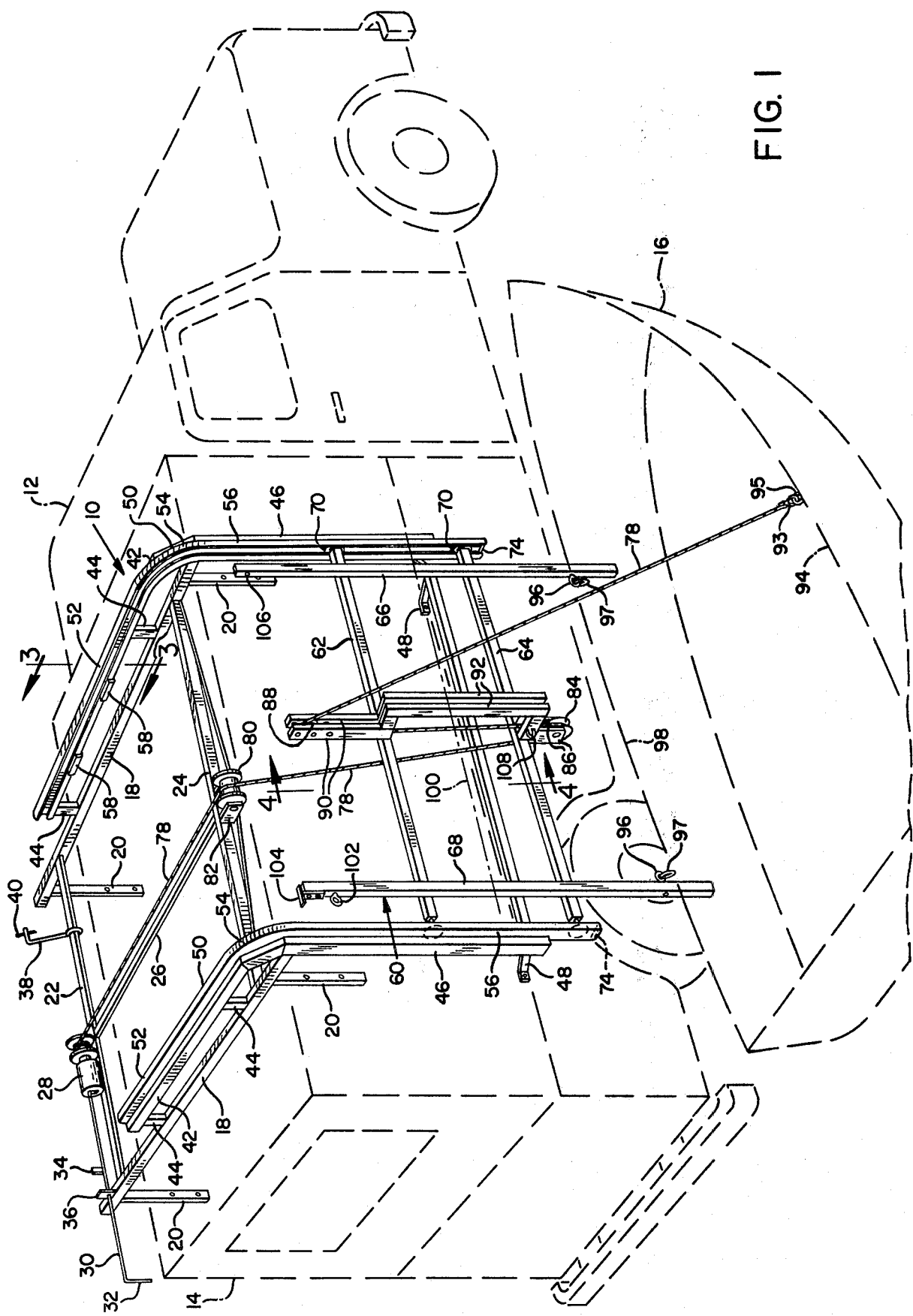
FIG. 1 is a perspective view showing an exemplary boat loader embodying the present invention mounted on a pick-up truck equipped with a camper top.

Referring first to FIGS. 1 and 2 of the drawings, a boat loader 10 is shown mounted on a pick-up truck 12 equipped with a camper top 14. A boat 16, which may be a rowboat or an outboard motorboat from which the motor has been removed, is shown resting on the ground in an upright position alongside the pick-up truck 12, connected to the loader 10 in readiness for being loaded atop the truck 12.

The loader 10 may be constructed principally of rectangular tubular steel stock. A pair of base rails 18 are secured to the top of the camper top 14 by appropriate means such as mounting legs 20 attached to the camper top 14 by conventional fasteners. The base rails 18 are spaced a small distance above the top of the camper 14. The amount of spacing depends upon the shape of the top of the vehicle on which the boat loader 10 is mounted, with the loader preferably being as low as possible without interference from the vehicle top.

A far side longitudinal rail 22 and a near side longitudinal rail 24 are fixedly connected to the base rails 18, extending between the base rails 18 and holding them parallel with one another and extending transversely of the pick-up truck 12. A transverse rail 26 extends between the longitudinal rails 22 and 24, supporting a winch 28 mounted adjacent the far side longitudinal rail 22.

The winch 28 may be electrically driven, powered by the vehicle's electrical system. A winch operating control rod 30 extends from the winch 28 rearwardly to the rear end of the boat loader and includes a lever 32 used to control the winch 28. A stop lever 34 extends upwardly from the control rod 30, at a location intermediate the winch and the lever 32. A bearing 36, which may simply be a hole in a metal ear, supports the control rod 30 adjacent the base rail 18 at the rear end of the boat loader, permitting the control rod 30 to be rotated by means of the lever 32 to control the switch of the winch 28. Rotating the rod 30 through a small angle clockwise causes the winch 28 to rotate in a cable-winding direction. Rotating the rod 30 counterclockwise causes the winch to rotate in the opposite direction, and a central position of the lever 32 stops the winch 28.

A hook 38 is attached to the far side longitudinal rail 22, as by an eye surrounding the far side longitudinal rail 22. A retainer pin 40 is removably fitted in a hole extending transversely through the end of the hook 38.

A pair of rail support members 42, which may also be of rectangular tubular metal stock, are supported above the base rails 18 by spacers 44. The rail support members 42 include downwardly depending portions 46 whose lower ends are supported by brackets 48 suitably fastened to the pick-up truck 12, as by being bolted to the side of the vehicle or its camper top 14. A pair of roller tracks 50 each comprising a horizontal portion 52, a curved connecting portion 54, and a downwardly depending portion 56, are associated with the rail support members 42.

As shown in FIG. 3 in greater detail, the roller tracks 50 may be of a type similar to that commonly used to support overhead-opening garage doors. The rail support members 42 are welded to the roller tracks 50 to provide necessary stiffening and support. Reinforcing members 58, which may be short lengths of angle stock, are welded to the bottom of the horizontal portions 52 to provide additional strength at the locations where the weight of the boat 16 is concentrated during transport.

A carriage 60 carried movably on the tracks 50 comprises an upper longitudinal rail 62 and a parallel lower longitudinal rail 64 ("upper" and "lower" referring to the positions of the rails as seen in FIGS. 1, 2 and 4). A pair of transversely extending boat support arms 66 and 68 are fixedly fastened adjacent the front and rear ends, respectively, of the longitudinal rails 62 and 64. They may be attached thereto by fasteners such as bolts extending through the boat support arms 66 and 68 and the longitudinal rails 62 and 64, permitting the boat support arms 66 and 68 to be easily exchanged in case modification of the loader is necessary to accommodate a different-sized boat. A wheel 70 is mounted on an axle 72 extending from each end of each longitudinal rail 62 and 64.

The tracks 50 are open toward one another to receive the wheels 70 of the carriage 60, permitting the axle 72 of each wheel 70 to extend within the respective one of the tracks 50. A stop 74 is located in the lower end of each downwardly depending portion 56 to limit downward travel of the carriage 60.

A cable 78, for example a flexible steel cable, is attached to the winch 28. The cable 78 extends transversely across the horizontal upper portion of the boat loader 10 and around a roller 80 connected to the near side longitudinal rail 24 on a strengthened bearing support 82. The roller 80 is located in a position aligned with the arcuate connecting portions 54 of the tracks 50 to keep the cable 78 clear of the top of the vehicle and generally aligned with the horizontal and vertical portions 52 and 56 of the tracks 50. The cable 78 extends downwardly from the roller 80 when the carriage 60 is in a lowered position, passing around a lower sheave 84 supported rotatably between a pair of arms 86 extending downwardly away from the lower longitudinal rail 64 as best seen in FIG. 4. The lower sheave 84 is positioned low enough on the carriage 60 to ensure that the carriage 60, carrying a boat 16, has tilted beyond the point of balance toward the inverted position during loading while the direction of pull of the cable 78 still has an upward component. For example, the bottom edge of the sheave 84 may be 4 inches below the longitudinal member 64, with the cable-bearing surfaces of the roller 80 spaced 4 inches inward from and below the curved portion 54 of the tracks 50. The cable 78 extends upwardly away from the sheave 84 on the opposite side of the longitudinal rails 62 and 64, extending further around an upper sheave 88 supported rotatably between a pair of upper sheave support members 90 which are parts of a pair of transverse central carriage members 92.

The transverse central carriage members 92 are welded to the longitudinal rails 62 and 64, connecting the rails 62 and 64 rigidly to one another, and the sheave support members 90 extend upwardly as shown in FIGS. 1 and 4. The transverse central members 92 include legs which space the transverse portion of each transverse central member 92 outwardly away from the vehicle 12, providing clearance to permit the carriage 60 to move around the edge of the vehicle 12. Space is provided between the two upper sheave support arms 90 and between the two transverse members 92, providing freedom for the cable 78 in those areas to move into the space between the longitudinal members 62 and 64.

The portion of the cable 78 extending away from the upper sheave 88 extends toward the far side of the boat 16, to which it may be connected as by a suitable snap hook 93 or a shackle mounted on the free end of the cable 78 and a suitable point of attachment such as an eye bolt 95 mounted in the outer side 94 of the boat 16. The location of the sheave 88 is adjustable, to accomodate boats of different widths. With a wider boat 16, a higher position of the sheave 88 is preferred, to fully tilt the boat 16 into contact with the carriage 60 before the carriage 60 moves upward in the tracks 50 during loading.

As shown in FIG. 1, a pair of eye bolts 96 are fitted to the lower ends of the boat support arms 66 and 68, and suitable fasteners such as shackles or detachable chain links 97 fastened to eye bolts mounted in the near side 98 of the boat 16 may be used to connect the near side 98 to the eye bolts 96. Preferably the eye bolts 96 are separated from the imaginary center line 100 of the carriage 60 by a distance equal to one-half of the width of the boat 16, and the stops 74 are located in the tracks 50 in a position which places the eye bolts 96 approximately even with the height of the gunwale of the boat 16 when the carriage 60 is in its lowered position on the depending portions 56 of the tracks 50. This will result in the boat 16 being centered laterally on the carriage 60 in the transport configuration, and simplifies connecting the near side 98 of the boat to the carriage 60.

The boat loader 10 of the present invention is operated by attaching the near side 98 of the boat 16 to the carriage 60, as by the above-mentioned eye bolts 96 and links 97, with the carriage 60 in the lowered position in which the wheels 70 are located in the depending portions 56 of the tracks 50. A releasable fastener such as the snap hook 93 attached to the free end of the cable 78 is attached to the eye bolt 95 on the outer side 94 of the boat 16, and the winch 28 is then operated by rotating the rod 30 clockwise as seen from the rear of the vehicle 12, to wind in the cable 78.

As the cable 78 winds upon the winch 28 the outer side 94 of the boat is lifted. The entire boat 16 pivots about the eye bolts 96 to a sideways vertical position in which the outer side 94 is above the near side 98 and the gunwales of the boat 16 rest against the boat support arms 90. The outer side 94 of the boat may then, but need not, be connected to an eye bolt 102 located in the upper, or far, end of the rear boat support arm 74.

As the cable 78 is further wound in upon the winch 28, the carriage 60 and the boat 16 move upwardly along the depending portions 56 of the tracks 50. As the wheels 70 encounter the curved connecting portions 54 of the tracks 50 the carriage 60 tilts toward the vehicle 12. The outwardly offset position of the central transverse members 92 provides clearance for the roller 80 and cable 78 between the longitudinal rails 62 and 64 as the carriage 60 moves around the upper edge of the camper top 14, guided by the connecting portions 54 of tracks 50. As the cable 78 is wound in yet further the carriage 60 assumes a horizontal position with the boat 16 inverted and supported upon the boat support arms 66 and 68. The carriage 60 continues to move horizontally until a limit arm 104 adjustably connected to the upper end of the rear boat support arm 68 encounters the stop lever 34 forcing the control rod 30 to rotate to the "off" position, stopping the motor of the winch 28. The hook 38 may then be placed through a hole 106 in the upper end of the front boat support arm 66 and secured by the removable pin 40 to lock the carriage 60 securely in place for transport of the boat on the loader.

With the carriage 60 in the transport position the wheels 62 are positioned over the reinforcing members 58 associated with the horizontal portion 52 of each of the tracks 50, and the boat 16 and carriage 60 are located centrally atop the vehicle.

To lower the boat 16 requires that the hook 38 be released from the hole 106 in the front boat support arm 66 and that the control rod 30 be turned counterclockwise to unwind the cable 78 from the winch 28. Preferably the vehicle 12 will be on level ground or tilted slightly toward the side on which the rails 50 extend downwardly, in order to maintain tension in the cable 78 during the process. Once the carriage 60 reaches its lowermost position against the stops 74 the outer side 94 of the boat should be disconnected from the eye bolt 102, after which further extension of the cable 78 permits the boat to tip downward to a horizontal upright position alongside the vehicle 12. After disconnecting the snap hook 93 from the eye bolt 95 and the near side 98 of the boat 16 from the eye bolts 96 the snap hook 93 on the free end of the cable 78 may be connected to a staple 108 provided on one of the transverse members 92, permitting the carriage 60 to be lifted and returned to the position on the horizontal portions 52 of the tracks 50 by rewinding the cable 78 on the winch 28. The carriage 60, without the boat 16, may then be locked into the transport position using the hook 38 and pin 40.

While the above-described boat loader 10 has been installed to permit loading of the boat 16 on the right side of the vehicle 12, it will be apparent that such a loader could also be mounted on a vehicle for operation on the left side if that should be more convenient. Similarly, while the apparatus of the invention has been shown used as a boat loader it will be apparent that it could also be used for raising other loads to the top of a vehicle and that it might also be installed in a position enabling items such as boxes to be raised to the top of a vehicle over either side or the rear of the vehicle.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A boat loader for moving a boat between an upright position adjacent a vehicle on which said boat loader is mounted and an inverted position atop said vehicle, and for thereafter supporting the boat during travel of the vehicle, the boat loader comprising:

(a) a frame adapted for being mounted on a vehicle;

(b) a pair of tracks having respective downwardly depending and horizontal portions joined by respective arcuate portions, said pair of tracks being mounted parallel with each other on said frame;

(c) a carriage mounted on said pair of tracks, said carriage including a pair of generally parallel apart-spaced longitudinal rail members, each extending between said tracks, each longitudinal rail member having a pair of opposite ends and means associated with each of said opposite ends for movably engaging a respective one of said tracks and guiding said carriage therealong between a lowered position on said downwardly depending portions of said tracks and a raised position on said horizontal portions of said tracks, said carriage further including a pair of parallel transverse central carriage members spaced apart from each other and fixedly attached transversely across said longitudinal rails at a central location therealong;

(d) guide means associated with said frame and said carriage for guiding an elongate flexible tension-supporting member, said guide means including an upper sheave and a lower sheave each rotatably mounted between and supported by said transverse central carriage members;

(e) an elongate flexible tension-supporting member extending through said guide means and having an attached end and a free end;

(f) means associated with said attached end of said elongate flexible tension-supporting member for retracting and extending it for raising and lowering said carriage along said tracks between said lowered position and said raised position, said elongate flexible tension-supporting member extending from said means for retracting and extending, further extending downwardly and around said lower sheave, thence upward, thence around said upper sheave and to an object to be lifted, when said carriage is in said lowered position.

2. The boat loader of claim 1 wherein each of said transverse central carriage members includes an arm which extends downward from a one of said longitudinal rail members which is lower than the other when said carriage is located in said lowered position, and an upper sheave support member which extends upwardly above a one of said longitudinal rail members which is higher when said carriage is in said lowered position.

3. The boat loader of claim 2 wherein said upper sheave support members include adjustable means for holding said upper sheave optionally in any of a plurality of locations along said upper sheave support members.

4. The boat loader of claim 2 wherein said lower sheave is located between said arms at a position far enough below the one of said longitudinal rails which is lower when said carriage is in said lowered position so that said elongate flexible tension-supporting member remains under tension in a direction including an upward component acting on said carriage at the location of said lower sheave at least until said carriage and a boat carried thereon have rotated through a position of balance toward an inverted position of such a boat, during raising of said carriage along said tracks.

5. The boat loader of claim 2 wherein said upper sheave is located high enough relative to said boat so that retraction of said elongate flexible tension-supporting member with said free end thereof attached to an outer side of said boat results in said boat being tilted upwardly towards said carriage before said carriage is raised substantially along said tracks.

6. The boat loader of claim 1, including a pair of apart-spaced boat supporting arms, each of said boat supporting arms being fixedly attached to and extending transversely across said longitudinal rail members of said carriage adjacent a respective end of said longitudinal rail members.

7. The boat loader of claim 6 including means for pivotably connecting a near side of a boat to each of said boat supporting arms.

8. The boat loader of claim 1 including attachment means associated with said free end, for connecting said free end alternatively either to said carriage or to a boat.

9. The boat loader of claim 1, wherein said guide means includes a roller rotatably carried on said frame and aligned with said arcuate portions of said tracks, and wherein said transverse central carriage members each include a pair of legs extending outwardly with respect to said carriage and a transverse portion, extending transversely of said carriage between said legs and spaced apart from said longitudinal rail members far enough to avoid said roller as said carriage moves along said arcuate portions of said tracks.

10. The boat loader of claim 1, including automatic means for stopping said means for retracting and extending, when said carriage reaches a predetermined position on said tracks.

* * * * *